A. STAUFFER.
FAN CRANK ATTACHMENT.
APPLICATION FILED MAY 14, 1915.
1,188,569.
Patented June 27, 1916
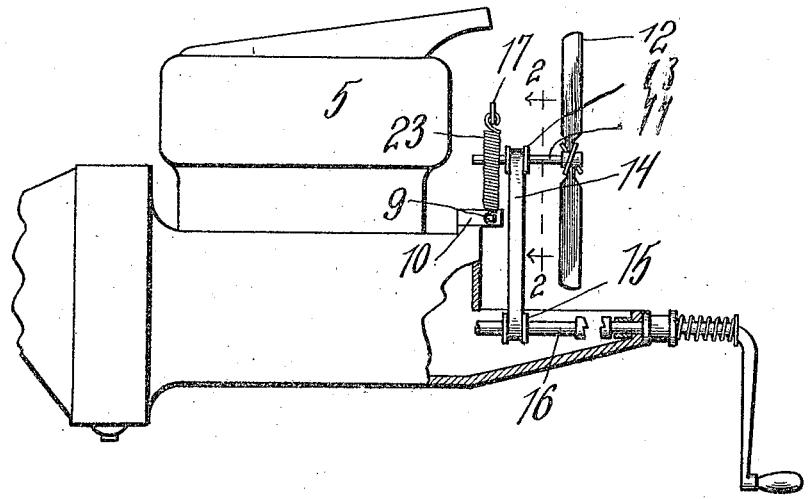
Fig. 1.
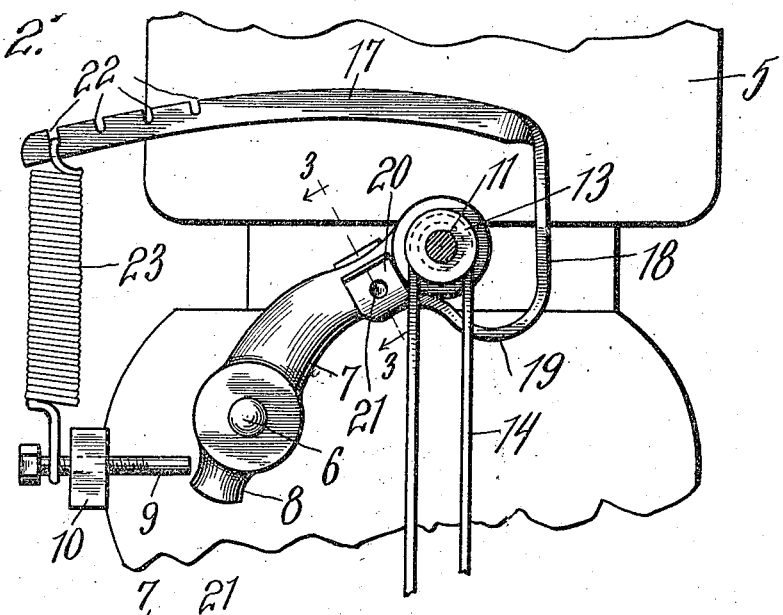
Fig. 2.
Fig. 3.
Witnesses
Inventor
Alfred Stauffer
By C. L. Parker
Attorney

UNITED STATES PATENT OFFICE.

ALFRED STAUFFER, OF HOBERG, MISSOURI.

FAN-CRANK ATTACHMENT.

1,188,569.

Specification of Letters Patent. Patented June 27, 1916.

Application filed May 14, 1915. Serial No. 38,026.

*To all whom it may concern:*

Be it known that I, ALFRED STAUFFER, a citizen of the United States, residing at Hoberg, in the county of Lawrence and State of Missouri, have invented certain new and useful Improvements in Fan-Crank Attachments, of which the following is a specification.

My invention relates to an attachment for use in connection with the pivoted fan crank of a Ford automobile, for maintaining the fan belt under continuous yielding tension.

An important object of the invention is to provide an attachment of the above mentioned character, which may be quickly and conveniently applied to the fan crank of a Ford automobile, without altering the construction thereof.

Other objects and advantages of the invention will be apparent during the course of the following description.

In the accompanying drawings forming a part of this specification and in which like numerals are employed to designate like parts throughout the same, Figure 1 is a side elevation of the engine in the Ford automobile, showing my attachment applied to the fan crank, Fig. 2 is a transverse section taken on line 2—2 of Fig. 1, with the attachment in side elevation, in use, and Fig. 3 is a transverse sectional view taken on line 3—3 of Fig. 2.

In the drawings, wherein for the purpose of illustration is shown a preferred embodiment of my invention, the numeral 5 designates a Ford engine as a whole. Pivotally mounted upon the crank case or other part of the engine, as shown at 6, is the usual fan bracket 7. At its lower end, this fan bracket projects downwardly beyond the pivot 6, in the form of an extension 8, adapted to be engaged by an adjusting bolt 9, having screw-threaded engagement with an apertured lug 10, preferably formed integral with the crank case. The upper end of the fan bracket 7 has a horizontal fan shaft 11 suitably journaled therein, having a fan 12 rigidly attached to its forward end. This fan shaft carries a grooved pulley 13, engaged by a fan belt 14, engaging a grooved pulley 15, rigidly mounted upon the crank shaft 16 of the engine. This is the usual construction in the Ford engine, and the belt is ordinarily tightened by screwing up the bolt 9, which swings the fan bracket 7 upwardly. This adjustment is rigid and does not retain the belt under continuous yielding tension, whereby the belt not infrequently stretches and slips in operation, without the operator being aware of the same.

My attachment comprises an arm 17, having one end thereof bent downwardly, as shown at 18, and horizontally as shown at 19. The horizontal portion 19 of this arm is provided with an approximately U-shaped head 20, one side of which is open for receiving the outer portion of the fan crank 7. The U-shaped head is provided with a clamping screw or bolt 21, for engagement with the fan bracket 7, to lock the head 20 thereto. In this manner the head may be detachably and rigidly mounted upon the fan bracket, in a convenient and expeditious manner. The arm 17 is provided near its free end with notches or openings 22, for receiving the hooked end of a suitably stiff retractile coil spring 23, having its lower end hooked for engagement with the bolt 9, as shown.

With the arm 17 secured to the fan bracket 7, and the spring 23 connecting the free end of the arm 17, and the bolt 9, it is obvious that the spring 23 exerts a continuous yielding upward pressure upon the fan bracket, whereby the fan belt 14 is retained under a continuous yielding tension, thus preventing the same from slipping.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described the invention, I claim:

1. The combination with a pivoted bracket, of an adjusting bolt to limit the swinging movement of the bracket in one direction, a pulley carried by the bracket, a belt engaging the pulley, an arm arranged above the bracket and having means for securing it to the bracket, and a retractile coil spring connecting the arm and adjusting bolt.

2. The combination with a pivoted bracket, of a pulley carried by the bracket, a belt to engage the pulley, an arm having a head to receive a portion of the bracket, means to hold the head in place upon the bracket, and a retractile coil spring connected with the arm to move it in one direction to tighten the belt.

3. The combination with a pivoted bracket, of a pulley carried by the bracket, a belt to engage the pulley, an arm provided with a tubular head having an opening formed through one side thereof to permit of the passage of the bracket into the tubular head, a clamping element carried by the tubular head to contact with the bracket, and a spring connected with the arm to move it in one direction to tighten the belt.

4. The combination with a pivoted bracket, of a pulley carried by the bracket, a belt engaging the pulley, an arm arranged above the bracket and having means to secure it to the bracket, and a retractile coil spring connected with the arm to move it in one direction.

In testimony whereof I affix my signature in presence of two witnesses.

FRED STAUFFER.

Witnesses:
W. A. AGAN,
WARREN M. POTS.